United States Patent Office 2,978,398
Patented Apr. 4, 1961

2,978,398

NEUTRONIC REACTOR

Herbert E. Metcalf and Henry W. Johnson, Chicago, Ill., assignors to the United States of America as represented by the United States Atomic Energy Commission Filed Nov. 28, 1945, Ser. No. 631,408

6 Claims. (Cl. 204—193.2)

This invention relates to neutronic reactors, and more particularly to a method and apparatus for removing heat from a neutronic reactor in a form capable of converting a fluid into a vapor, preferably into high temperature steam to produce power in a useful form.

In neutronic reactors, a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general, such reactors comprise bodies of compositions containing such fissionable material, for example, natural uranium, disposed in a neutron slowing material which slows the neutrons to low or thermal energies. Such a slowing material is termed a neutron moderator. Carbon, beryllium, and $D_2O$ (heavy water) are typical moderators suitable for such use. In the invention to be herein particularly disclosed, a moderator using beryllium will be described. Specific details of the theory and essential characteristics of such reactors are set forth in the copending application of Enrico Fermi and Leo Szilard, Serial No. 568,904, filed December 19, 1944, now Patent 2,708,656, dated May 17, 1955.

Various types of coolants, methods, and apparatus have been used to dissipate the heat of a neutronic reaction within a neutronic reactor. The coolants are usually forced through definite channels within the moderator for the neutronic reactor in which the uranium or other form of fissionable material is positioned. The arrangement of such channels is determined by the uranium body geometry; and, for heat removal at high power output, the coolants are usually applied under pressure in order to force them through the channels in sufficiently large quantities to obtain a required temperature equilibrium during operation.

Various types of cooled reactors have been disclosed in the above-mentioned copending application one being such a water cooled neutronic reactor. However, in a water cooled neutronic reactor of this type, although a large amount of power in the form of low temperature heat (up to 250,000 kw. in some designs) may be removed by water cooling, nevertheless, this power is not in a form to be suitably or profitably used in heat engines. Furthermore, in reactors cooled in this manner with the coolant discharged through the reactor, the K factor is reduced, necessitating the use of a large reactor. The present invention is primarily concerned with a form of reactor, which may be known as a flattened reactor, having one dimension of 6 to 8 feet or less. In this type of reactor, the uranium rods or other form of fissionable material are passed through the small dimension, and may be provided with a sheath or a heat conducting sleeve of beryllium. The rods so sheathed are insulated from each other by a moderator formed of beryllium oxide. Heat is conducted along the composite rod, and then only on the outside of the reactor, preferably on each side, the heat is released into a suitable coolant, as for example water, through a heat exchanger on the ends of the rods, to vaporize the coolant, thus producing steam when water is used.

In one preferred form of the invention, the neutronic reactor has a heat exchanger in the form of a steam boiler on each side of the reactor. The heat conducting sheath or sleeve formed of beryllium for the uranium rod has several times the heat conductivity of uranium. Furthermore, the use of the beryllium sleeve has a negligible effect on K. This sleeve is used to increase the heat conduction outwardly from the reactor. In the preferred form of the heat exchanger construction, a copper plug extends through the wall of the heat exchange device and may be attached to the beryllium sleeve, making a steam-tight joint which may be suitably gasketed, if necessary.

In the construction of the moderator, the beryllium oxide may be used in the form of bricks and the moderator construction serves also to insulate the uranium rods. Heat is conducted along the rods to the copper heat exchanger, heating the water in the boiler. With the center of the rod at an elevated temperature, a satisfactory temperature differential may be had to produce a temperature of over 100° C. in the water, causing the water to be vaporized into steam, depending upon the pressure at which it is desired to operate the boiler.

In certain modifications of this invention to be described later, since in reactors of this type the center of the reactor is hotter than the peripheral portions, it is possible to utilize modern boiler practice wherein the ends of the active portions of the outermost uranium rods may be used to preheat the fluid to be vaporized. In this case, the ends of the central rods within the center of the reactor are used to raise the fluid to be vaporized to substantially over 100° C. after having been preheated by passing over the ends of the outer rods. In accomplishing this feature of the invention, it is preferred to utilize a baffle of insulating material to separate the high temperature zone of the boiler corresponding to that of the reactor from the preheating zone of the boiler corresponding to the outer preheating zone of the reactor.

In further embodiments of the invention to be described, there is disclosed a type of reactor wherein copper clamps screwed on the ends of the uranium-beryllium rods are placed around water tubes to vaporize the water within the tubes. A modification of this form of reactor construction is also described wherein the ends of the central rods provide the high temperature for heating the steam tubes and the ends of the outer rods in the reactor preheat the water in accordance with modern boiler practice.

In the moderator construction to be described, particularly in the form wherein steam tubes are used, it is preferred to use beryllium oxide to insulate the steam water tubes and at the same time to act as a partial reflector.

Control of the reactor in the embodiments to be described is accomplished by the use of a control rod, and the operation of the control rod is in accordance with the disclosure of the above-mentioned copending application. When the uranium rods or other form of fissionable material within the reactor reach a desired temperature within the preferred range of operation such as, for example, substantially 600° to 800° C. and at the power output desired, the control rod is left in its operating position; and, whenever it is desired to stop the neutronic reaction, the control rod is operated as set forth above in the copending application. For further safety, safety rods may be used.

It is therefore a principal object of the invention to provide a novel apparatus and method of efficiently utilizing the heat of a neutronic reaction within a neutronic reactor to generate power in a useful form such as vaporized steam or other fluid at high temperature which may be used in commercially available forms of power converters such as steam turbines, reciprocating engines, and the like.

Another object of this invention is the provision of a novel form of neutronic reactor ideally suited to heat the coolant fluid in heat conducting relationship with respect to the active portion of the reactor without entering the reactor.

Other objects and advantages of the present invention will be more readily understood from the following description taken with the attached drawings wherein the same reference characters indicate the same or similar parts:

Figure 4:
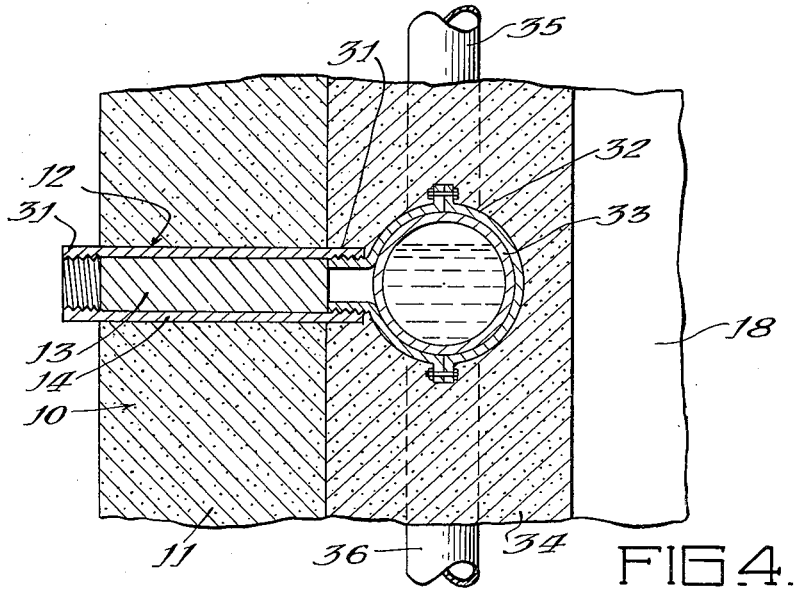
Figure 5:
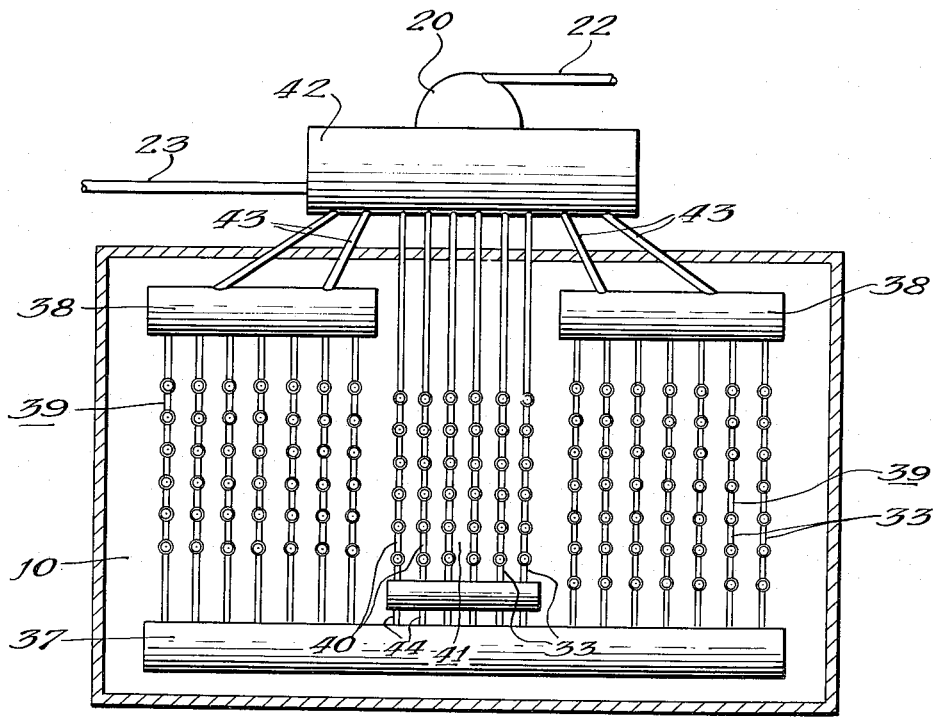

Figure 4 is a diagrammatic cross-section of a modified form of flattened type of neutronic reactor construction wherein the uranium-beryllium rod construction of the active portion is in heat conducting relationship with water tubes which are placed in the reflector construction; and, Figure 5 is a diagrammatic cross-section of a further modification of the construction of Figure 4 in which the water tube construction is formed into a preheating zone and high temperature zone wherein the coolant fluid is preheated and further superheated to vaporize the fluid into a useful form to be used in a suitable power converter such as a turbine and the like.

In Figures 1 to 5, a novel form of flattened neutronic reactor 10 and modifications thereof are shown which may be used in carrying out the objects of this invention.

Figure 1:
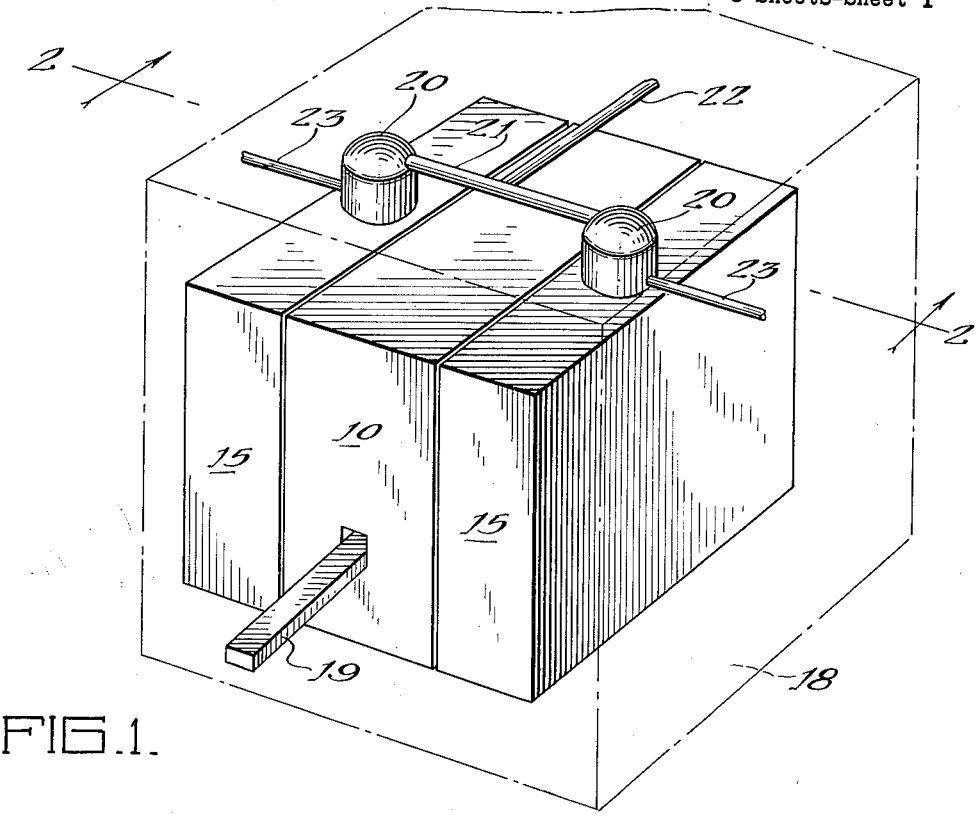
Figure 1 is a schematic drawing in perspective illustrating a flattened type of neutronic reactor in combination with a novel form of heat exchange construction for conducting the heat of the neutronic reaction of the reactor to a heat exchange device in the form of a boiler construction for the vaporization of the coolant fluid within the boiler.
Figure 2:
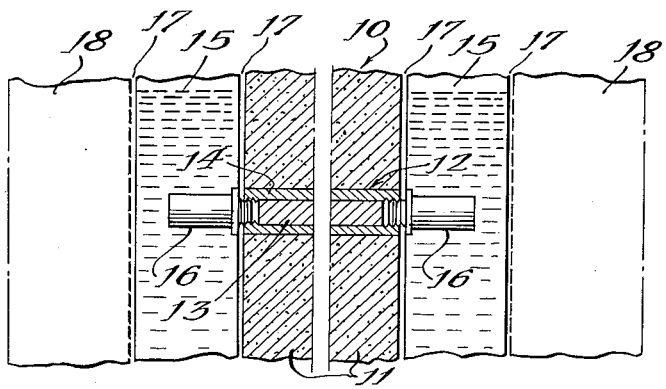
Figure 2 is a fragmentary diagrammatic cross section taken through Figure 1 on the line 2—2, looking in the direction of the arrows, and taken through the novel form of heat exchange construction comprising a uranium-beryllium rod construction for transferring the heat of the neutronic reaction from the reactor to the heat exchange device in combination therewith.

Referring to Figures 1 and 2, it is preferred to use a moderator 11 formed of beryllium oxide in which are positioned fissionable material and heat exchange rod constructions 12, forming the active portion of reactor 10. The novel construction 12 preferably comprises a rod 13 containing the fissionable material of the reactor. This may be formed of uranium or other fissionable material as previously disclosed in the above-mentioned copending application, and the number of rods 13 shall be such as to bear a definite volume ratio with respect to the moderator utilized, these rods being placed throughout the reactor in a definite pattern or lattice so that the reactor will have a reproduction ratio greater than unity in order to provide a self-sustaining chain reaction.

Surrounding the rod 13 is a sheathing 14 in the form of a hollow rod or tube preferably of beryllium in heat conducting relationship with respect to the rod 13. It is preferred to use beryllium because of its high heat conductivity with respect to uranium and because of its low capture cross-section with respect to neutrons. In this particular construction, it is preferred to use a uranium rod construction having a diameter of 5.50 centimeters which is equal to substantially 2.165″ and a thickness of the beryllium sheathing of 1 inch.

Specific reactor construction dimensions using a beryllium-oxide moderator are as follows:

VOLUME RATIO OF 20 PTS. OF BeO TO 1 PT. U

Radius of U rods _____ 2.75 centimeters
Diameter of U rods _____ 5.50 centimeters
Area of U rods _____ 23 square centimeters
Thickness of Be coating _____ 1 inch
Area of Be coating _____ 27 square centimeters
Value of K _____ 1.1 for BeO density$^2$
$M^2$ _____ .323 ft.$^2$
Diameter _____ 10.2 feet, for $h=6$ feet
Total vol. pile _____ 490 cubic feet
From vol. ratio _____ 468 cubic feet BeO In the particular embodiment illustrated in Figures 1 and 2, the rod constructions 12 extend through the narrow portion of the reactor 10. The width of the narrow portion of the reactor 10 may be computed from the formula:

$$\frac{5.28}{R^2}+\frac{2}{h^2}=\frac{K-1}{M^2}$$

wherein R is the radius, $h$ is the thickness, and K is the reproduction factor, and M is the migration length of a neutron within its particular moderator.

The following data is tabulated with respect to a larger reactor of the type herein disclosed using beryllium oxide as the moderator and which will produce approximately 1570 kw. power output, which may be utilized in the generation of power in the form of vaporized steam heated from the heat of the neutronic reaction:

BeO $M^2=287.5$ cm.$^2$
35.3 tons U
145.5 tons BeO
$K=1.0628$
$h=8$ feet
$R=10.4$ ft.
$D=20.8$ ft.
Density $U=18.5$
Density BeO$=3$
Density Be$=1.85$ Wt. ratio $\frac{145.5}{35.8}=4.06$ Vol. ratio$=40.6$ Total uranium rod area, each end$=8.4$ sq. ft. U.
Total beryllium sheath area, each end$=8.4$ sq. ft. Be.
Thermal conductivity U$=.061$ cal./cm.$^2$/° C./sec.
Thermal conductivity Be$=.380$ cal./cm.$^2$/° C./sec.

$.061 \times \frac{8450 \times 800}{122} = \begin{cases} 3400 \text{ cal./sec.}-1 \text{ end uranium rods} \\ 6800 \text{ cal./sec.}-\text{both ends uranium rods} \end{cases}$ $.380 \times \frac{8450 \times 800}{122} = \begin{cases} 21200 \text{ cal./sec.}-1 \text{ end beryllium sheaths} \\ 42400 \text{ cal./sec.}-\text{both ends beryllium sheaths.} \end{cases}$ Total heat$=49,200$ cal./sec. both ends$=206$ kw.

Assuming carbon moderator without recomputing critical size, i.e. smaller value of power. Thermal conductivity of $C=0.070$ cal./cm.$^2$/° C./sec. 300,000 cm.$^2$ area of one side of reactor $.070 \times \frac{300,000 \times 800}{122} = \begin{cases} 138000 \text{ cal./sec. 1 side of reactor} \\ 276000 \text{ cal./sec. both sides of reactor} \end{cases}$ 276000
49000
―――――
325000 cal./sec.$=1360$ kw.

However, assuming cosine distribution or $\frac{1}{.866}$ heat transfer, total $=1570$ kw.

It is obvious that reactors of other sizes and powers are within the scope of this invention utilizing the above disclosure and the teachings of the above-mentioned copending application with respect to the theory and calculations for an operable chain reacting system utilizing a fissionable material and a moderator.

In the preferred embodiment with respect to the specific disclosure, it is desired to use, therefore, a flattened type of reactor in which the short dimension through the reactor is substantially 8 feet for the above-described specific form of reactor. It is, therefore, obvious then that the uranium-beryllium rod construction will be substantially 8 feet in length. The length of the reactor in the other direction, therefore, will be substantially 21 feet, the longitudinal cross-section of the moderator being modified into substantially a rectangle proportioned so that the volume ratio of the beryllium oxide moderator with respect to the uranium or other fissionable material may be maintained.

Again referring to Figures 1 and 2, suitable heat exchange devices in the form of steam boilers 15 are in heat conducting relationship with respect to the multiple rod constructions 12 of the reactor 10. It is preferred that a heat exchange device 15 be mounted at each end of the rod construction 12 although it is within the scope of the invention to mount a device 15 only at one end of the rod constructions 12. However, for better heat transfer and to obtain more efficient utilization of the heat of fission within the rod constructions 12, it is preferred to construct a flattened reactor of the type with heat exchange devices at each end of the rod constructions. Extending within each heat exchange device 15 are copper heat exchangers 16, preferably in threaded engagement, with respect to the beryllium sheaths 14. Wherever necessary to prevent the fluid from the heat exchange device 15 penetrating within the moderator, the rod construction 12 may be suitably gasketed at each end. It is desired to form the shell 17 of each of the heat exchange devices 15 in accordance with the best boiler construction practice, any suitable material being used to preserve the necessary rigidity and at the same time to serve as a support for the beryllium-oxide moderator construction.

The beryllium-oxide moderator construction may be formed from a series of bricks suitably formed to be stacked in the form of the moderator illustrated in Figure 1; and wherever necessary, the beryllium-oxide bricks in the moderator 11 through which the rod constructions 12 pass may be formed to support and separate constructions 12. Since beryllium-oxide is a satisfactory heat insulator as well as a moderator for neutrons, it is evident that the heat of fission within the rod construction will be transmitted to each end of the rod construction in heat transfer relation with the fluid within the boiler to be vaporized.

Suitable shielding in the form of a biological shield construction 18 is formed contiguous to the moderator and boiler construction as illustrated in Figures 1 and 2 to protect the operating personnel from the harmful radiations caused by the neutronic reaction. This biological shield construction may take any form well known in the art such as described in the above-mentioned copending application, and may be in the form of a water shield or in the form of concrete or other construction. The shielding shall be of such a dimension in thickness to prevent the penetration of beta and gamma rays and also shall serve as a reflector for the neutrons. For example, since the water within the boiler construction 15 serves to absorb harmful radiations, the thickness of the shield 18 may be somewhat reduced.

The neutronic reaction within the reactor 10 may be controlled with a suitable control rod 19 and an operating mechanism, not shown. For the particular structure of the control rod as well as the construction of the safety rods for use with a neutronic reactor of this type, reference is made to the above-mentioned copending application, since the control rod construction need not be disclosed in detail herein for the understanding of this invention.

The boiler construction preferably comprises suitable steam headers 20, which in the embodiment illustrated in Figure 1, may be connected together by suitable piping 21 and the steam or other vaporized fluid be distributed to suitable power converters or heat exchange devices by a distribution system 22 to supply the fluid to be vaporized. Fluid inlet piping 23 is connected to the steam headers 20 as illustrated. In the preferred embodiment herein described, the fluid supplied to the heat exchange device is preferably water although it is within the scope of the invention that any suitable fluid may be utilized within the heat exchange devices 15 which may be suitably vaporized to provide the necessary temperature pressure conditions required in the respective power converters. With water heated to the temperature of 250° in a closed vessel, the relative outlet pressure of the steam is 576 pounds per square inch. It is obvious that by varying the operating conditions that various ranges of temperatures and pressures and superheat of the steam may be obtained.

Figure 3:
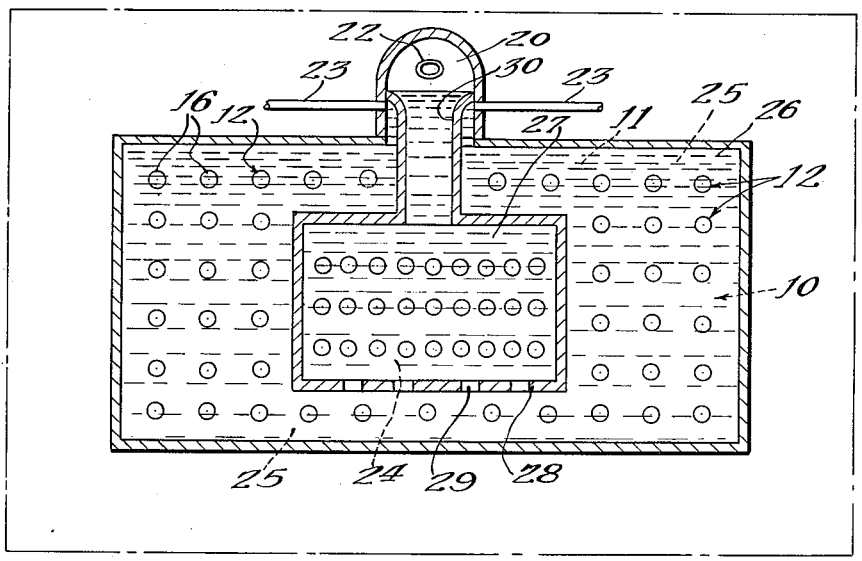
Figure 3 is a diagrammatic cross-section through a heat exchanger disposed adjacent a neutronic reactor including a preheat and a high temperature zone for preheating and superheating the coolant fluid in heat conducting relationship with respect to the neutronic reactor.

Referring to Figure 3, there is illustrated a modification of the embodiment of the invention as disclosed in Figures 1 and 2, wherein the reactor construction 10 of Figure 1 and the heat exchange devices 15 are modified into a preheat zone and a high temperature zone. In this figure the same numbers as used in Figures 1 and 2 are applied to corresponding elements. It has been estimated that in the operation of neutronic reactors the hottest part of the reactor is where the neutron density is the greatest, this usually occurring at the center of the reactor, though it is within the scope of the invention to change the relative position of the hottest portion of the reactor by what is known popularly as "flattening the reactor" or adjusting the neutron density within the reactor to accomplish the desired results. This may be accomplished in several ways, one of them by changing the amount of the active uranium within the rod construction, such as the insertion of inactive material. For the purpose of this disclosure, however, it is desired to have the hottest portion of the reactor occur in the high temperature zone 24, Figure 3, and with the lower temperature of the reactor occurring in the preheat zone 25 of the reactor. The uranium rod construction used in this modification is the same illustrated with respect to Figure 2 and, therefore, the rod construction 12 need not be further described. The copper heat exchangers 16 extend within the heat exchange devices 15 as described with respect to the construction illustrated in Figure 2.

It is preferred, however, to modify the heat exchanger device 15 of Figure 1 by separating the heat exchanger into two parts comprising the preheat zone 26 and the high temperature zone 27, respectively, corresponding to the preheat zone 25 of the neutronic reactor and the high temperature zone 24 of the reactor. The preheat zone 26 and the high temperature zone 27 of the modified device 15 are separated by a suitable insulating baffle 28. It is obvious from the illustration, Figure 3, that, as the fluid to be preheated, such as water, is supplied through the water inlet pipe 23 to the preheat zone 26, the water is preheated by the preheat zone 25 of the reactor. The flow of the preheated water will be through the passage 29 to the high temperature zone 27 of the boiler where it will be heated to the operating temperatures desired to vaporize the fluid; whereupon, it will be discharged through an outlet passage 30 from the high temperature zone 27 into the steam dome 20 and discharged through the piping 21 and 22 as illustrated with reference to the embodiment illustrated in Figure 1. It is obvious from the modification that fluids may be preheated to any preferred range within the preheat zone and then vaporized or superheated in the high temperature zone within the temperature and pressure ranges desired. As disclosed, it is obvious that a simple boiler and reactor construction has been described to accomplish this particular object of the invention, namely: to preheat and vaporize any particular fluid which has the qualities desired for the particular temperature and pressure conditions specified for a suitable commercial form of power converter which may be utilized to convert the heat generated in the reactor in a particular heat cycle to mechanical power.

Referring to Figure 4, there is illustrated another embodiment of the invention wherein the rod construction 12 of Figure 2 is modified as at 31 to receive a copper heat exchanger 32 which corresponds to and functions as the heat exchange device 15 of the construction of Figure 2. In this figure the same numbers as used in Figures 1 and 2 are applied to corresponding elements. The copper heat exchanger 32 is in the form of a clamp which may be suitably affixed in heat conducting relationship with respect to a water tube 33. It is preferred to use copper tubing although other forms of metal tubing may be used depending upon the pressure for which the heat exchange device is designed.

Referring to Figure 5, it is desired that, where each of the rod constructions 12 extends through the moderator, each rod construction in a particular vertical alignment shall be coupled in heat conducting relationship with respect to a water tube in alignment with a vertical row of the active rod constructions 12. Although the invention is shown in Figure 5 illustrating vertical tubing 33, it is within the scope of the invention that the water tubing 33 may be connected in parallel horizontal rows, the headers at each end being modified accordingly. In this particular embodiment, as illustrated in Figure 4, it is preferred to use a partial reflector 34 of beryllium oxide. It is obvious that the beryllium oxide reflector 34 may be formed of suitable bricks of beryllium oxide and fabricated to receive the water tubes 33 and the clamps 32 and that these bricks may be readily stacked to form the reflector. The beryllium oxide reflector construction also serves as suitable heat insulation for the water tubes 33. It is also desired to utilize a shield construction 18 similar to that described with reference to Figure 1 and 2 to protect the operating personnel from the harmful radiations caused by the neutronic reaction. With this particular construction, it is obvious that the reactor construction is relatively the same as that disclosed with respect to Figure 2.

In this construction, as illustrated with reference to Figure 4, it is desired to use the double boiler construction with the heat exchange devices 33 in heat conducting relationship with respect to each end of the rod constructions 12 although it is evident that wherever necessary a single heat exchange construction may be used without departing from the scope of the invention. The water tubes 33 may connect into suitable inlet and outlet headers 35 and 36, Figure 4, connected to the top and bottom of the water tubes, these, in turn, connected to suitable piping for supplying the fluid to be vaporized and to discharge piping from the discharge of the vaporized fluid.

Whereas the modified construction of Figure 4 utilizing water tubes 33 corresponds to the heat exchange construction 15 of Figure 2, the modified water tube construction of Figure 5 corresponds to the heat exchange construction utilizing the preheat zone and high temperature zone of Figure 3. In Figure 5, the preheated tubes 33 are connected as illustrated to headers 37 and 38, forming the preheat zones 39. It is preferred to connect the modified rod construction 12 of the reactor in which the neutron density is less as a result of the neutron reaction within the corresponding part of the reactor. It is obvious that any arrangement of tubes may be utilized such as illustrated in Figure 5, and it is desired to couple the rod construction of the reactor in which the neutron intensity is the greatest causing the highest temperatures to be formed therein to the water tubes 40 which are formed into a high temperature zone 41. It is obvious that as the neutronic reaction is initiated and brought up to the power desired the water or other fluid which is discharged from a water inlet 23 to a water drum 42 will discharge through piping 43 to the headers 38, then as the water is preheated in the preheat zones 39, the preheated water will discharge into the header 37 and from there through piping 44 to a header 45 to which the high temperature tubes 40 are connected forming the high temperature zone 41. In the piping 40, the high temperature zone 41 discharges into the steam and water drum 42, the steam being collected in a steam drum 20 and discharged through piping 21 and 22 as illustrated with respect to Figure 1. It is obvious that there has been disclosed a novel form of boiler tube construction for use with a flatttened type of neutronic reactor to preheat and vaporize a fluid so that the vaporized fluid may be used in modern power converters, such as turbines or the like.

With the constructions, therefore, as illustrated in Figures 3 and 5, it is obvious that a reactor so arranged may be utilized to preheat boiler water in the outer portions of the reactor and to vaporize the water or other fluid in heat conducting relationship with respect to the hottest portions of the reactor.

In this particular form of flattened reactor and especially the reactor for which the specific dimensions were given, the beryllium oxide forming the moderator serves to change the fast neutrons to slow neutrons to produce a self-sustaining chain reaction such as herein contemplated and also functions as a heat insulator between the rod constructions forming the active portion of the moderator. Likewise, the beryllium surrounding the active uranium or other fissionable material serves to act as a moderator and also to conduct the heat of fission formed within the fissionable material due to the chain reaction outside of the moderator to the fluid in heat exchange relationship which serves to cool the reactor and at the same time to provide a source of vaporized fluid suitable to be converted to power. In the specific embodiment of the invention, the heat conducted by the uranium forming the active rod construction is relatively small with respect to the heat conducted by the beryllium sheathing. The thermal conductivity of the uranium is 0.061 calories/cm.$^2$/°C./sec. whereas the thermal conductivity of beryllium is 0.380/calories/cm.$^2$/°C./sec. The rate of heat transmission through the beryllium is equal to 0.3847/cal. sec./cm.$^2$/°C./cm. The thermal conductivity of uranium which is given as 0.061 cal./cm.$^2$/°C./sec. is equal to 14.76 B.t.u./hr./sq. ft./unit gradient. The thermal conductivity of uranium oxide, $UO_2$ is 0.00034 cal./cm.$^2$/°C./sec.

Although this invention has been particularly described utilizing beryllium oxide as the moderator, it is also within the scope of this invention that graphite may be utilized as a moderator as more particularly disclosed in the above mentioned copending application. The thermal conductivity of graphite is 0.070 cal./cm.$^2$/°C./sec., and this assumes block interfaces of 10 x 10 x 75 cm. blocks, which is equal to, in terms of B.t.u. 16.84 B.t.u./hr./sq. ft./unit gradient.

Although this invention is disclosed primarily as a source of power, when the system is operated for an extended period of time, there is a high production output of element $94^{239}$. Although in the particular embodiments described, the uranium rods may not be readily removed, for the processing of element $94^{239}$ it is, however, obvious that the structure as disclosed may be suitably modified without departing from the scope of the invention to permit the insertion and removal of uranium rods 13 within the beryllium sheathing or the removal and insertion of the rod construction comprising the uranium and beryllium construction into and from the moderator of the reactor.

Also, when this flattened type of reactor is operated at high operating conditions, the large amount of heat generated must be removed in order to stabilize the chain reaction. Most of the heat in an operating device of this character is generated as the result of the nuclear fissions taking place in the $U^{235}$ isotope. Thus, the rate of heat generation is largely proportional to the rate at which the fissions take place. In other words, as the rate of generation of neutrons is increased, a greater amount of coolant must pass in heat conducting relationship with respect to the uranium-beryllium rod construction of the reactor in order to remove the heat thus generated to avoid damage particularly to the central portion of the pile by excessive heat; and, such a construction has been particularly provided for in the embodiments illustrated in Figures 3 and 5 with respect to the preheating zone and high temperature zone of the reactor by modifying the heat exchange devices in accordance therewith. The amount of coolant utilized within the heat exchange device in combination with the novel reactor construction of this invention and the temperature range within which the heat exchange device and the neutronic reactor is operated is predetermined by the amount of power developed within the reactor and the period of time within which it is desired to operate the reactor after the reactor has come up to the predetermined operating temperature. As an example, however, of the conditions of operation, it is preferred that the reactor may be operated to have a maximum temperature within the rods of 800° C. while passing a coolant in heat conducting relationship with respect to the uranium-beryllium rod construction so that the fluid may be heated to a temperature of substantially 250° C. or to whatever temperature and pressure range within which it is desired to operated the heat exchange device in combination with the neutronic reactor of this type.

Other dimensions of the reactor with regard to the amount of beryllium oxide or graphite used in the moderator and the amount of active uranium or other fissionable materials in the reactor may follow the dimensions as disclosed in the above-mentioned copending application depending upon the type of moderator used and the particular lattice structure of the active fissionable material within the moderator, the critical and operating sizes for the reactor being calculated in accordance with the disclosure in the above-mentioned copending application. It is necessary that the reproduction ratio within the reactor shall be such that the exponential rise in density when the control rods are removed from the reactor shall not take place so rapidly that this rise cannot be readily controlled by the control rods 19. Suitable safety rods may also be provided when necessary.

In the operation of neutronic reactors as thus disclosed, when the reactors are brought up to power and are allowed to operate within the range described, if these reactors are not then cooled, the equilibrium radio activity within the active metal of the reactor is so intense that metal taken from the reactor for the recovery of element $94^{239}$ and fission products immediately after bombardment at high neutron densities will heat spontaneously due to self-absorption of the intense radio activity of the remaining radio active fission products. The amount of heat given off as the result of spontaneous heating will depend particularly on three factors: (1) the concentration of element $94^{239}$ and fission products in the metal; (2) the period of time for continuous operation required to reach this concentration; and (3) the elapsed time since the reactor was shut down and the metal was removed.

The metal from the center of the reactor in a system operating at a high power output, for example, at a $94^{239}$ concentration of 1 to 2,000, if not cooled, can increase in temperature at the rate of about 2000° C. per hour one day after the neutron activity of the system has been shut down. The average temperature rise may reach 575° C. per hour if the reactor is shut down for any length of time following operation over a long period at high power outputs. The uranium metal of the type used in the chain reacting system herein under consideration melts at about 1100° C.

In the operation of the modifications described above, the reaction is started by withdrawing the control rod 19. The neutron density rises at a rate determined by the reproduction ratio and the effect of the delayed neutrons, until some predetermined neutron density is attained. The control rod is then placed in the unity reproduction ratio position and the reaction is stabilized at the power desired. During this time, radioactive Te and iodine is formed decaying to xenon 135. This is known as the xenon effect causing the absorption of neutrons by the xenon 135 reducing the reproduction ratio below unity. This particular effect is more fully disclosed in the above-mentioned copending application and further discussion is not necessary for the understanding of this invention.

Although specific sizes of the reactor have not herein been disclosed, embodiments of reactors as illustrated in the above-mentioned copending application may be used as modified in accordance with the above disclosure. In the reactors, particularly those utilizing graphite as the moderator, the volume ratio of the graphite to the uranium or other fissionable material of about 100 to 1 is used. The weight of uranium is approximately 100 tons and of the graphite approximately 860 tons. This form of reactor when fabricated in accordance with the disclosure of the above-mentioned copending application will be just above the critical size when the reproduction ratio is unity. When the control rod is removed from the reactor, the neutron reproduction ratio in the reactor will be slightly above unity. With the rod removed, the neutron density in the reactor rises and heat is developed which is to be absorbed as herein above described. When the desired operating power is reached, the control rod 19 is inserted to reduce the neutron reproduction ratio to unity thereby holding the reactor at the power attained at the end of the neutron density rise. As described above, in reactors operating at high neutron densities, radioactive elements of exceedingly high capture cross section may be formed relatively quickly in the uranium as an intermediate element in the decay chains of the fission fragments and this formation can change the neutron reproduction ratio during operation if these elements remain in the reactor. One of the most important of these decay chains is believed to be the 135 fission chain starting with Te(short)→I(6.6 hrs.) Xe(9.4 hrs.)→Cs(20–30 yrs.)→barium, the parenthetical times indicating half-lives. As pointed out above, this is known as the xenon effect, and the effect in high power reactors is fully disclosed in the copending application of Enrico Fermi and Leo Szilard, Serial No. 568,904, filed December 19, 1944, above mentioned.

It is also within the scope of this invention to apply the herein disclosed invention to reactors wherein the active portion is enriched in fissionable isotopes such as, for example, by raising the $U^{235}$ content or adding $94^{239}$ or $U^{233}$. Such enrichment will permit reduction in reactor size in accordance with the amount of enrichment made. Too great a reduction in size is not preferred since it would be necessary to greatly modify the heat exchanger construction with respect to the active portion of the reactor. However, the present invention is applicable to enriched reactors of any size and type known to those skilled in the art.

Summarizing, it will be seen from the above-description that reactors in combination with a heat exchange device and operated in accordance with the disclosure of this invention are ideally suited to provide the continuous production of a vaporized fluid, such as steam resulting from the heat of a nuclear reaction at temperatures sufficiently high to be useful and efficient to produce power. These advantages in a power plant or steam plant of this type can be summarized as follows:

(1) The power is in the form to be used directly in modern power converters such as steam engines;

(2) Substantially all of the power is used, as escaping neutrons and gamma radiations are caught in the boilers or tubes and the heat produced enters into preheating;

(3) Nothing but the control rod is inserted in the flattened reactor construction, completely separating nuclear physics from the thermo-dynamics of the heat exchange device;

(4) K is maximum thereby providing for a practical size permitting short rod constructions of uranium or other fissionable material.

Although this invention has been disclosed using water as the preferred coolant, it is within the scope of the invention to use other coolants which are used in modern heat exchange devices. It is preferred to operate the reactor with the coolant in the heat exchanger as a liquid. However, it is within the scope of this invention that the coolant within the heat exchange device may be a vapor, particularly as an example, in superheating steam.

It is also to be understood that this invention is equally applicable to other types of reactors including those having liquid moderators, such as deuterium oxide or other reactors constructed in accordance with the general principles described in the above-mentioned copending application, for example, uranium containing greater than usual concentrations of $U^{235}$ may be used. Alternately, the invention may be applied to other fissionable compositions such as $U^{233}$, $94^{239}$, etc., or to combinations of these fissionable isotopes with $U^{238}$ or $Th^{232}$ or similar istotope which yields a fissionable isotope by neutron absorption.

While the theory of the nuclear chain fission mechanism in uranium set forth herein is based on the best presently known experimental evidence, it is not desired to be bound thereby, as additional experimental data later discovered may modify the theory disclosed.

What is claimed is:

1. In a neutronic reactor comprising a body of moderator having members containing thermal neutron fissionable material therein and being of such size and configuration as to undergo a neutronic chain reaction, the improved construction wherein there are provided elongated members of material of higher heat conductivity than said fissionable members surrounding said fissionable members and extending beyond the active portion of the reactor, and means for flowing a fluid coolant in thermal contact with only the extending ends of said heat-conductive members.

2. The improved neutronic reactor structure of claim 1, wherein the fissionable members are in the form of parallel rods extending between opposite faces of the moderator body, and the heat-conductive members are in the form of tubes tightly surrounding said rods.

3. The improved neutronic reactor structure of claim 1 wherein the heat-conductive members are of beryllium.

4. The improved construction of claim 3 wherein the moderator body is beryllium oxide.

5. The improved neutronic reactor structure of claim 1 wherein the fluid flow means includes means for flowing the fluid coolant first in thermal contact with the ends of those of the heat-conductive members which surround fissionable members in low neutron-density portions of the reactor and then in thermal contact with the ends of those of the heat-conductive members which surround fissionable members in high neutron-density portions of the reactor.

6. The improved construction of claim 5 wherein the latter-mentioned means includes a chamber enclosing the ends of the heat-conductive member, an apertured insulating baffle between the ends of respective groups of heat-conductive members dividing the chamber into respective portions, means for flowing a coolant fluid into the portion of the chamber containing the ends of those of the heat-conducting members which surround fissionable members in low neutron density portions of the reactor, and means for removing coolant fluid from the portion of the chamber containing the ends of those of the heat-conductive members which surround fissionable members in high neutron-density portions of the reactor.

References Cited in the file of this patent

UNITED STATES PATENTS

| 809,842 | Price et al. | Jan. 9, 1906 |
| 2,708,656 | Fermi et al. | May 17, 1955 |

FOREIGN PATENTS

| 114,150 | Australia | May 2, 1940 |
| 861,390 | France | Oct. 28, 1940 |
| 233,011 | Switzerland | Oct. 2, 1944 |

OTHER REFERENCES

Goodman: "The Science and Engineering of Nuclear Power," volume 1, page 275, Addison-Wesley (1947).

Kelly et al.: Phy. Rev. 73, 1135-9 (1948).